United States Patent [19]

Tamura

[11] Patent Number: 4,667,758
[45] Date of Patent: May 26, 1987

[54] ARRANGEMENT STRUCTURE OF AN ENGINE RADIATOR IN A STRADDLED TYPE VEHICLE

[75] Inventor: Gen Tamura, Kokubunji, Japan

[73] Assignee: Honda Giken Kogyo Kabushiki Kaisha, Tokyo, Japan

[21] Appl. No.: 802,111

[22] Filed: Nov. 25, 1985

[30] Foreign Application Priority Data

Dec. 28, 1984 [JP] Japan .............................. 59-196524[U]

[51] Int. Cl.⁴ .............................................. B60K 11/04
[52] U.S. Cl. .................................... 180/68.4; 180/229
[58] Field of Search ...................... 180/68.4, 68.1, 229, 180/215, 68.6

[56] References Cited

U.S. PATENT DOCUMENTS

| 2,581,072 | 1/1952 | Brezek ................................. 180/68.1 |
| 4,535,869 | 8/1985 | Tsutsumikoshi ..................... 180/215 |
| 4,557,345 | 12/1985 | Hamane et al. ..................... 180/229 |
| 4,570,740 | 2/1986 | Hara .................................... 180/229 |

FOREIGN PATENT DOCUMENTS

| 21657 | 1/1981 | European Pat. Off. ............ 180/229 |
| 136518 | 8/1983 | Japan .................................... 180/229 |
| 59-146218 | 9/1984 | Japan .................................... 180/68.4 |
| 59-146219 | 9/1984 | Japan .................................... 180/68.4 |
| 227522 | 12/1984 | Japan .................................... 180/68.1 |
| 10498 | 3/1909 | United Kingdom ................ 180/229 |

Primary Examiner—David M. Mitchell
Attorney, Agent, or Firm—Armstrong, Nikaido, Marmelstein & Kubovcik

[57] ABSTRACT

An arrangement of an engine radiator in a straddled type vehicle such as a four-wheel buggy vehicle is improved in that an aperture is formed in the rear wall of each front wheel fender, a first louver is disposed so as to cover the front side of the aperture for achieving a mud-guard function and also introducing running wind flowing along the inner surface of the fender into the aperture, each of engine radiator units which jointly form an engine radiator is supported from a vehicle body frame so as to be positioned behind the first louver as opposed to the aperture, and a second louver is disposed so as to cover the rear side of each engine radiator unit for guiding warm running wind which has passed through the engine radiator unit outwards in the widthwise direction of the vehicle body frame.

4 Claims, 3 Drawing Figures

ARRANGEMENT STRUCTURE OF AN ENGINE RADIATOR IN A STRADDLED TYPE VEHICLE

BACKGROUND OF THE INVENTION

1. Field of the Invention

The present invention relates to an engine radiator in a straddled type vehicle of the kind that a driver rides the vehicle while straddling a saddleshaped seat similarly to an motorcycle, and more particularly to an arrangement structure of an engine radiator in the so-called buggy vehicle having two front wheels or a motor car provided with large-width low-pressure tires.

2. Description of the Prior Art

Recently, straddled type buggy vehicles have been popular for leisure use or as practical utility vehicles. In this vehicle, a vehicle body frame formed of pipe materials, a rod-like handle, a saddle-shaped seat and low-pressure tires are employed similarly to a motorcycle.

In such buggy vehicles, often there is provided a body cover.

In this case, an engine mounted at the central portion of the vehicle body frame would be also necessarily covered by the body cover (For instance, see Laid-Open Japanese Utility Model Specification No. 59-146218 and Laid-Open Japanese Utility Model Specification No. 59-146219).

In a buggy vehicle having such structure, the engine would be hardly exposed to moving air, and hence a method for cooling the engine would become an issue. In the case where an engine radiator is employed in order to achieve the cooling, it is necessary to pay attention to the position of arrangement of the engine radiator, and in the vehicle disclosed in Laid-Open Japanese U.M. Specification No. 59-146218, the engine radiator is disposed on the front surface of a front cover, while in the vehicle disclosed in Laid-Open Japanese U.M. Specification No. 59-146219, the engine radiator is disposed in front of a steering shaft.

However, in either case, the arrangement is such that the moving air which has passed through the engine radiator and has become warm would flow towards the engine, and so, this arrangement is not favorable in view of a cooling efficiency.

SUMMARY OF THE INVENTION

It is therefore one object of the present inventions to provide a novel arrangement structure of an engine radiator in a straddled type buggy vehicle, which can achieve cooling of an engine at a high efficiency.

According to one feature of the present invention, there is provided an arrangement structure of an engine radiator in a straddled type vehicle including, a vehicle body frame, an engine disposed at a central portion of the vehicle body frame, a saddleshaped seat disposed at an upper central portion of the vehicle body frame, a steering handle disposed at the top and at the center in the widthwide direction of the vehicle body frame, front wheels disposed on the left and right sides in a front portion of the vehicle body frame, and fenders disposed above and behind the respective front wheels, which arrangement structure comprises apertures formed in the rear walls of the front wheel fenders, louvers disposed so as to cover the front side of the apertures for achieving a mud-guard function, and engine radiator units supported from the vehicle body frame so as to be positioned behind the respective louvers as opposed to the apertures.

With the above-featured arrangement structure of an engine radiator, moving air flowing along the lower surfaces of the front wheel fenders would pass through the louvers, the apertures and engine radiator units, but muddy water and the like splashed by the front wheels would be blocked by the louvers and prevented from entering the apertures. Therefore, these radiator units jointly forming a radiator for an engine can be efficiently cooled by the fresh cold air passing therethrough without being contaminated by muddy water and the like.

The above-mentioned and other objects, features and advantages of the present invention will become more apparent by reference to the following description of one preferred embodiment of the invention taken in conjunction with the accompanying drawings.

DESCRIPTION OF THE PREFERRED EMBODIMENT

Figure 2:
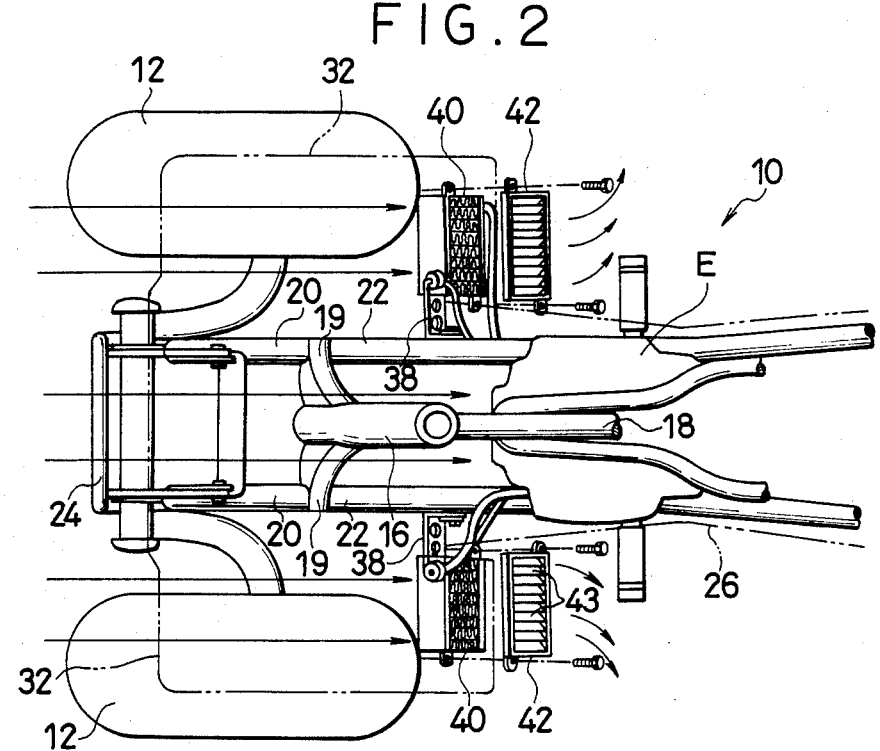
FIG. 2 is a plan view of an essential part of the straddled type four-wheel buggy vehicle shown in FIG. 1.
Figure 3:
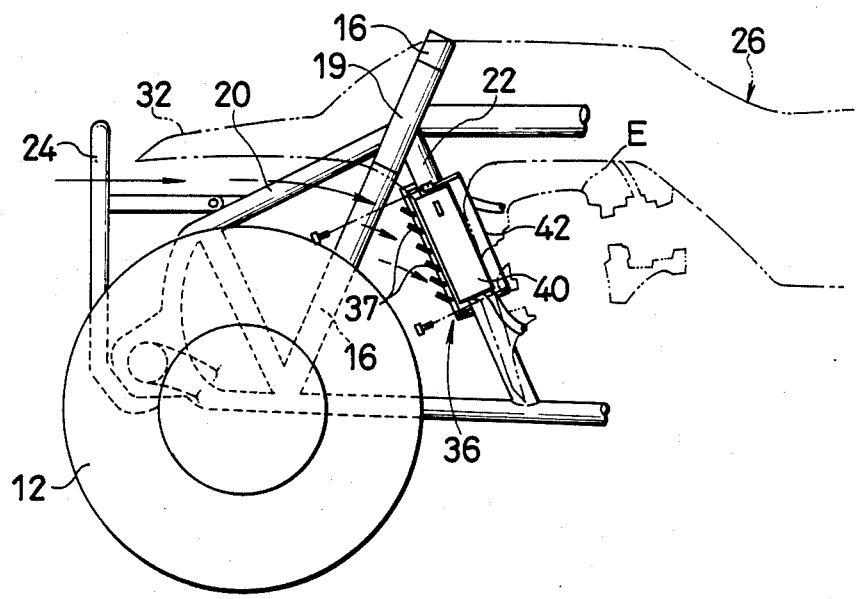
FIG. 3 is a side view of the structure shown in FIG. 2.

In the following, description will be made on one preferred embodiment of the present invention illustrated in FIGS. 1 to 3.

Figure 1:
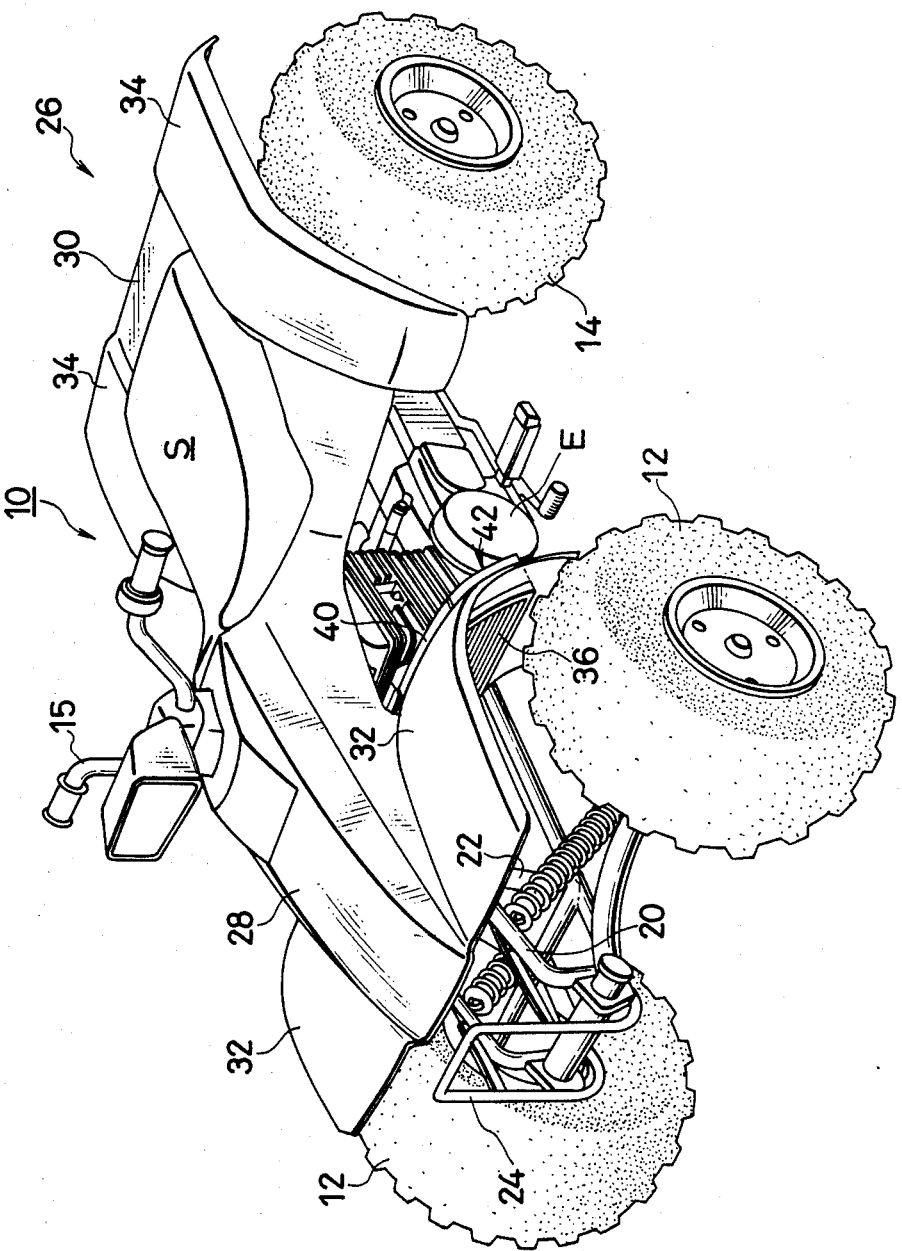
FIG. 1 is a general perspective view of a straddled type four-wheel buggy vehicle provided with an arrangement structure of an engine radiator according to the present invention.

Referring now to FIG. 1, a straddled type four-wheel buggy vehicle 10 is shown in a general perspective view, and this straddled type four-wheel buggy vehicle 10 is provided with a pair of front wheels 12 and a pair of rear wheels 14 each having a low-pressure large-width tire mounted thereon, and is also provided with a rod-like handle 15 similar to that of a motorcycle. A front section of a vehicle body frame of the straddled type four-wheel buggy vehicle 10 is constructed as shown in FIG. 2 and 3. That is, it comprises a handle rotary shaft bearing pipe 16 positioned at the center portion in the widthwise direction of the vehicle body for rotatably supporting a handle rotary shaft, a main pipe 18 connected to an upper portion of the handle rotary shaft bearing pipe 16 and extending in the backward direction of the vehicle body, a pair of left and right down pipes 20 which are connected to joint members 19 attached to the left and right sides, respectively, of the handle rotary shaft bearing pipe 16, which extend obliquely in the forward and downward direction, and after having bent generally in a U-shape, extend in the backward direction of the vehicle body, and a pair of left and right tilt pipes 22 connected at their top ends to the joint members 19 and connected at their bottom ends to the down pipes 20, and a front bumper pipe 24 is disposed in front of the left and right down pipes 20. And an engine E is mounted at a central portion both in the longitudinal direction and in the lateral direction of the vehicle body frame.

In addition, a body cover 26 covering the entire vehicle body of the straddled type four-wheel buggy vehicle 10, is formed as an integral body consisting of a front cover 28, a rear cover 30, front wheel covers (hereinafter called front fenders) 32 covering the left and right front wheels 12, and rear fenders 34 covering the left and right rear wheels 14. A saddle-shaped seat S is placed on the vehicle body frame at the nearly middle position among the front and rear wheels 12 and 14.

In a rear wall of each of the front fenders 32 is formed a substantially rectangular aperture. A front louver 36 is mounted on an inner wall surface of each of the front fenders 32 so as to cover the front side of the aperture. Engine radiator units 40 each forming a part of an engine radiator are supported from arm members 38 projecting to the left and the right, respectively, from the left and right tilt pipes 22 so as to be opposed to the respective apertures, and rear louvers 42 are mounted on the rear surfaces of the respective engine radiator units 40 to cover them. A plurality of air guide plates 37 in the front louver 36 are disposed in the widthwise direction of the vehicle body frame at a forwardly inclined upright attitude (See FIG. 3.), while a plurality of air guide plates 43 in the rear louver 42 are disposed substantially in the vertical direction at an attitude directed in the backward and laterally outward direction of the vehicle body (See FIG. 2.).

The illustrated embodiment is constructed in the above-described manner, so that during operation, air entering the space under the front fender 32 flows in the backward and downward direction as guided by the front fender 32, and the front louver 36 attached to the rear wall of the front fender 32 would capture the air and would guide the air through the aperture in the front fender 32 to the rear side where the engine radiator unit 40 is mounted. The air which has passed the engine radiator units 40 would flow in the outward directions, that is, in the left and right directions, respectively, of the vehicle body by the action of the rear louvers 42. Furthermore, air which has entered the interior of the front cover 28 through the central portion of the front surface of the vehicle body, would strike against the engine E and would directly cool the engine E.

As described above, since the aperture for the engine radiator unit is formed in the rear wall of the front fender 32 which can capture air most effectively and the front louver 36 provided with air guide plates directed in the direction adapted for introduction an air flow into the aperture is mounted to the front side of the aperture, cooling of the engine radiator unit 40 is effected extremely efficiently, and moreover, since warm wind which has passed through the engine radiator unit 40 would not flow towards the engine E, but the cold air entering the interior of the front cover 28 through the central portion of the front surface of the vehicle body would strike against the engine E, a cooling efficiency for the engine E is excellent.

In addition, even if muddy water and the like are splashed by the front wheels, the influence of the foreign matters upon the engine radiator units 40 can be effectively precluded because the air guide plates 37 in the front louver 36 are disposed at such an inclined attitude that the splashed materials can be blocked by the air guide plates 37.

As will be apparent from the above description, according to the present invention, owing to the fact that in a straddled type vehicle such as a four-wheel buggy vehicle on the like, an aperture is formed in the rear wall of a wheel cover or a fender for each of the front wheels, a louver having a mud-guard function is provided so as to cover the aperture, and an engine radiator unit supported from a vehicle body frame is disposed on the rear side of the louver as opposed to the aperture, the engine radiator unit can be effectively exposed to air, and also, since each of the engine radiator units is located farther than the engine in the widthwise direction of the vehicle with respect to a longitudinal center line of the vehicle body, the air which has passed through the engine radiator units and has been converted to warm wind would not flow towards the engine. In addition, the engine itself positioned at the center in the widthwise direction can be directly exposed to cold air which has not passed through the engine radiator unit, and so, cooling of the engine can be achieved very efficiently.

Moreover, muddy water and the like splashed by the front wheels would be effectively blocked by the louver and thus prevented from entering the aperture in the front fender, and therefore, contamination of the engine radiator units can be effectively precluded.

Since many changes and modifications can be made to the above-described structure without departing from the spirit of the present invention, it is intended that all matter described above and illustrated in the accompanying drawings shall be interpreted to be illustrative and not as a limitation to the scope of the invention.

What is claimed is:

1. An engine radiator configuration in a straddle-type vehicle having a vehicle body frame, an engine disposed at a central portion of the vehicle body frame, a pair of front wheels disposed on the left and right sides of said vehicle body frame and fenders disposed above and behind said respective front wheels, comprising apertures formed in the rear walls of said front wheel fenders, louvers disposed horizontally on the front side of said apertures at an angle sufficient to provide a mud-guarding function, and engine radiator units supported from said vehicle body frame and positioned behind said louvers.

2. An engine radiator configuration according to claim 1, further comprising louvers disposed behind said engine radiator units to direct air which has flowed through said radiator units outwardly of said vehicle body frame.

3. An engine radiator configuration according to claim 1, wherein said engine is disposed in said vehicle body frame at the center in the width wise direction so as to be directly exposed to cold air which has not passed through said engine radiator units.

4. An engine radiator configuration according to claim 2, wherein said louvers disposed behind said engine radiator units are disposed vertically.

* * * * *